US012752723B2

(12) United States Patent
Rutman et al.

(10) Patent No.: US 12,752,723 B2
(45) Date of Patent: Oct. 6, 2026

(54) POWERED VEHICLE ACCESSORY AND ACCESSORY POWERING METHOD

(71) Applicant: Ford Global Technologies, LLC, Dearborn, MI (US)

(72) Inventors: Matthew B. Rutman, Canton, MI (US); Eric S. Levine, Novi, MI (US); Galen Keith Thomas, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 365 days.

(21) Appl. No.: 17/716,058

(22) Filed: Apr. 8, 2022

(65) Prior Publication Data

US 2023/0109950 A1 Apr. 13, 2023

Related U.S. Application Data

(60) Provisional application No. 63/254,317, filed on Oct. 11, 2021.

(51) Int. Cl.

| | |
|---|---|
| ***B60R 16/03*** | (2006.01) |
| ***B60R 9/06*** | (2006.01) |
| ***B60R 16/02*** | (2006.01) |
| ***H02J 50/10*** | (2016.01) |

(52) U.S. Cl.

CPC .............. *B60R 16/03* (2013.01); *B60R 9/065* (2013.01); *B60R 16/0215* (2013.01); *H02J 50/10* (2016.02)

(58) Field of Classification Search

CPC ....................................................... H02J 50/10

See application file for complete search history.

(56) References Cited

U.S. PATENT DOCUMENTS

| | | | | |
|---|---|---|---|---|
| 6,571,949 | B2 | 6/2003 | Burrus, IV et al. | |
| 7,462,951 | B1 * | 12/2008 | Baarman | H02J 50/402 307/9.1 |
| 8,228,026 | B2 | 7/2012 | Johnson et al. | |
| 9,718,415 | B2 | 8/2017 | Squicciarini | |
| 10,583,962 | B2 | 3/2020 | Brunner et al. | |
| 10,703,534 | B2 | 7/2020 | Brunner et al. | |
| D895,966 | S | 9/2020 | Brunner et al. | |
| D895,967 | S | 9/2020 | Brunner et al. | |
| D896,517 | S | 9/2020 | Brunner et al. | |
| D896,518 | S | 9/2020 | Brunner et al. | |
| D897,103 | S | 9/2020 | Brunner et al. | |
| D898,320 | S | 10/2020 | Brunner et al. | |
| 10,962,218 | B2 | 3/2021 | Plato et al. | |
| 10,981,696 | B2 | 4/2021 | Brunner et al. | |
| D917,977 | S | 5/2021 | Brunner et al. | |
| D918,584 | S | 5/2021 | Brunner et al. | |

(Continued)

OTHER PUBLICATIONS

US 10,947,009 B2, 03/2021, Brunner et al. (withdrawn)

*Primary Examiner* — Daniel Kessie

(74) *Attorney, Agent, or Firm* — Vichit Chea; Carlson, Gaskey & Olds, P.C.

(57) ABSTRACT

A vehicle accessory assembly includes an accessory configured to engage a baseplate to secure the accessory to a vehicle. The accessory and the baseplate are configured to engage each other through an attachment system having feet that are each received within an aperture when engaged. The accessory is configured to provide electrical power to at least one device that is electrically coupled to the accessory.

35 Claims, 4 Drawing Sheets

(56) References Cited

U.S. PATENT DOCUMENTS

| | | | |
|---|---|---|---|
| D919,296 S | 5/2021 | Brunner et al. | |
| 11,008,136 B2 | 5/2021 | Brunner et al. | |
| D920,671 S | 6/2021 | Brunner et al. | |
| 11,027,883 B1 | 6/2021 | Brunner et al. | |
| D923,935 S | 7/2021 | Brunner et al. | |
| 11,192,690 B1 | 12/2021 | Brunner et al. | |
| 11,268,691 B2 | 3/2022 | Plato et al. | |
| 11,365,026 B2 | 6/2022 | Brunner et al. | |
| 11,427,382 B2 | 8/2022 | Brunner et al. | |
| 11,465,805 B2 | 10/2022 | Brunner et al. | |
| 2007/0040402 A1 | 2/2007 | Bork | |
| 2013/0207478 A1* | 8/2013 | Metcalf | H04B 5/79 307/104 |
| 2015/0130286 A1* | 5/2015 | Kozasu | H01F 38/14 307/104 |
| 2022/0009562 A1* | 1/2022 | Mannone | B62D 33/0207 |

* cited by examiner

POWERED VEHICLE ACCESSORY AND ACCESSORY POWERING METHOD

CROSS-REFERENCE TO RELATED APPLICATIONS

This application claims priority to U.S. Provisional Application No. 63/254,317, which was filed on 11 Oct. 2021 and is incorporated herein by reference.

TECHNICAL FIELD

This disclosure relates generally to an accessory of a vehicle and, more particularly, to powering a device from the accessory.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite.

SUMMARY

In some aspects, the techniques described herein relate to a vehicle accessory assembly, including: an accessory configured to engage a baseplate to secure the accessory to a vehicle, the accessory and the baseplate configured to engage each other through an attachment system having a plurality of feet that are each received within one of a plurality of apertures when engaged, the accessory configured to provide electrical power to at least one device that is electrically coupled to the accessory.

In some aspects, the techniques described herein relate to a vehicle accessory assembly, wherein the accessory is a cargo box having a hinged lid.

In some aspects, the techniques described herein relate to a vehicle accessory assembly, wherein the vehicle provides the electrical power that the accessory provides to the at least one device.

In some aspects, the techniques described herein relate to a vehicle accessory assembly, wherein the accessory receives the electrical power from the vehicle through the baseplate.

In some aspects, the techniques described herein relate to a vehicle accessory assembly, wherein the accessory includes the plurality of feet that are configured to engage the plurality of apertures within the baseplate.

In some aspects, the techniques described herein relate to a vehicle accessory assembly, further including at least one tab of the accessory, the at least one tab of the accessory configured to electrically couple to at least one tab of the baseplate when the accessory and the baseplate are engaged through the attachment system.

In some aspects, the techniques described herein relate to a vehicle accessory assembly, wherein the at least one tab is disposed on an upwardly facing surface of the accessory.

In some aspects, the techniques described herein relate to a vehicle accessory assembly, wherein the accessory receives the electrical power through an inductive coupling with the baseplate.

In some aspects, the techniques described herein relate to a vehicle accessory assembly, wherein the accessory includes at least one light, the at least one light powered with electrical power from the vehicle.

In some aspects, the techniques described herein relate to a vehicle accessory assembly, the plurality of feet each extend from the accessory, wherein, when the accessory is secured to the vehicle through the baseplate, the plurality of feet extend from a first side of the baseplate, through one of the plurality of apertures, and past an opposite, second side of the baseplate, the baseplate secured directly to the vehicle.

In some aspects, the techniques described herein relate to a vehicle accessory assembly, wherein, when the accessory is engaged with the baseplate, enlarged collars of the plurality of feet capture respective portions of the baseplate to block withdrawal of the plurality of feet from the plurality of apertures.

In some aspects, the techniques described herein relate to a vehicle accessory assembly, wherein the vehicle is a pickup truck and the baseplate is attached directly a floor of a cargo bed of the pickup truck.

In some aspects, the techniques described herein relate to a vehicle accessory assembly, wherein the accessory is configured to engage the baseplate when the accessory is in a first position, and when the accessory is in a second position that is rotated relative to the first position.

In some aspects, the techniques described herein relate to a vehicle accessory assembly, wherein a rotation of the accessory from the first position to the second position is rotation about a vertical axis.

In some aspects, the techniques described herein relate to a vehicle accessory assembly, wherein the accessory is configured to engage the baseplate in a third position that is different than the first position and the second position, and further configured to engage the baseplate in a fourth position that is different than the first position, the second position, and the third position.

In some aspects, the techniques described herein relate to a vehicle accessory power transfer method, including: receiving a plurality of feet within a plurality of apertures; sliding an accessory relative to a baseplate to engage the accessory with the baseplate and secure the accessory relative to a vehicle, the baseplate secured to the vehicle; and electrically powering at least one device using the accessory.

In some aspects, the techniques described herein relate to a vehicle accessory power transfer method, wherein the accessory is a cargo box having a hinged lid.

In some aspects, the techniques described herein relate to a vehicle accessory power transfer method, further including providing electrical power to the accessory from the vehicle.

In some aspects, the techniques described herein relate to a vehicle accessory power transfer method, further including delivering the electrical power to the accessory through the baseplate.

In some aspects, the techniques described herein relate to a vehicle accessory power transfer method, wherein the baseplate includes the plurality of apertures, and the baseplate is secured to the vehicle, wherein the accessory is configured to engage the baseplate when the accessory is in a first position, and when the accessory is in a second position that is rotated relative to the first position, the accessory configured to electrically power the at least one device when the accessory is in the first position and when the accessory is in the second position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a baseplate-based accessory attachment system for a vehicle. The system includes a baseplate that provides an attachment interface for securing accessories to the vehicle. Various types of accessories can be secured to the vehicle through the attachment interface provided by the baseplate. The number and positions of baseplates can be adjusted for particular vehicles or particular needs. The provides a user with a substantially modular attachment system. The accessory can power devices using power from the vehicle.

Figure 1:
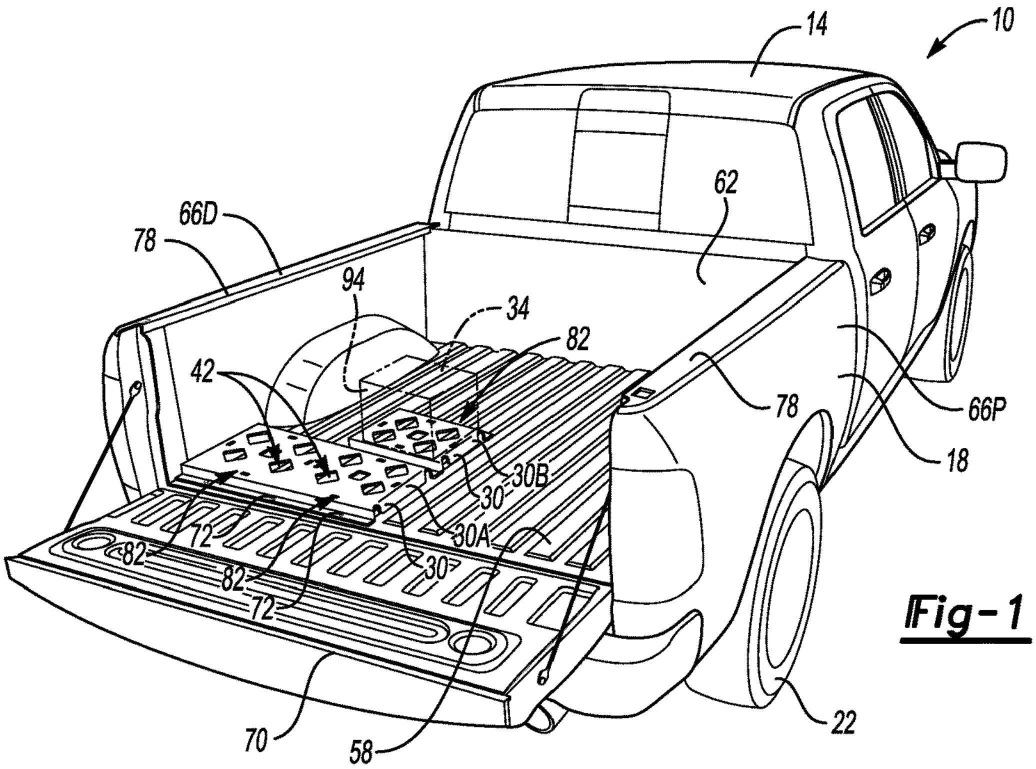
FIG. 1 illustrates a perspective view of a vehicle having a cargo bed equipped with baseplates that can be used to secure an accessory according to an exemplary aspect of the present disclosure.
Figure 2:
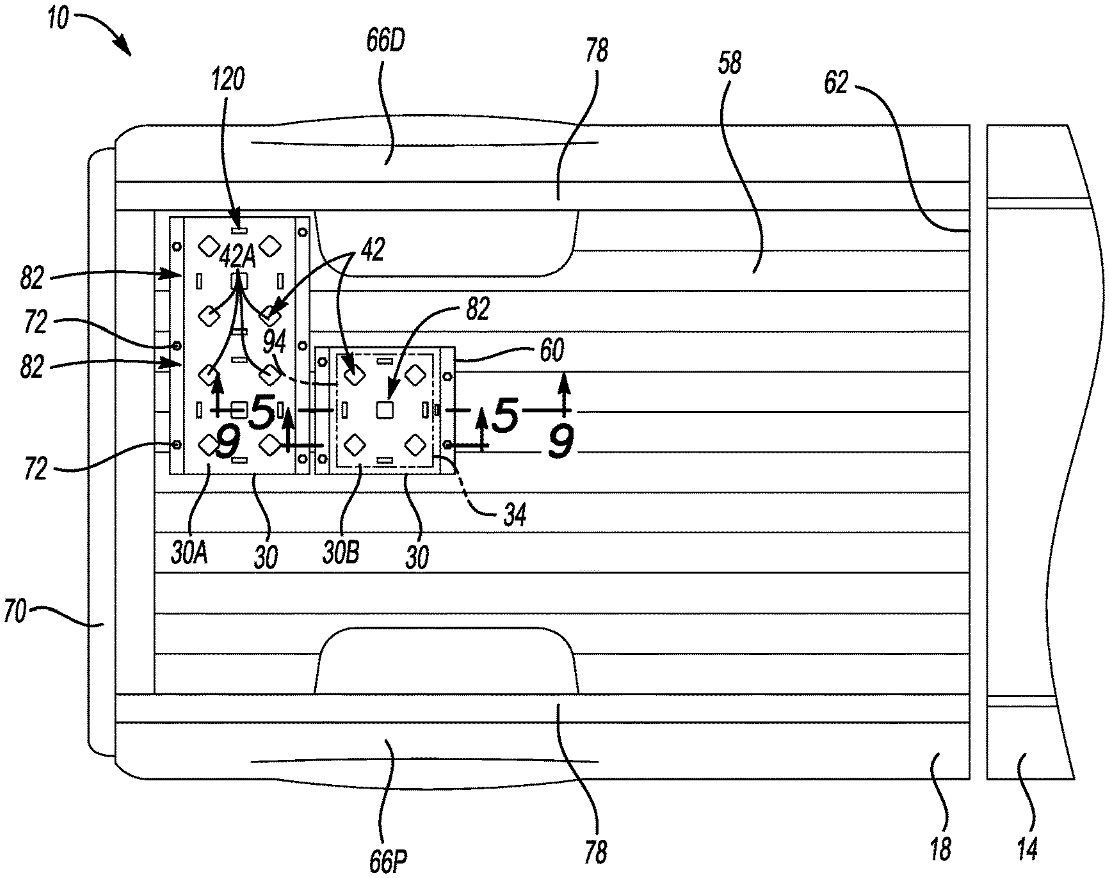
FIG. 2 illustrates a top view of the cargo bed and baseplates of FIG. 1.

With reference to FIGS. 1 and 2, a vehicle 10 includes a passenger compartment 14 and a cargo bed 18 that is aft the passenger compartment 14. The vehicle 10 is a pickup truck. The vehicle 10 could be another type of vehicle in another example, such as a car, van, sport utility vehicle, etc.

The example vehicle 10 is an electrified vehicle and, in particular, a battery electric vehicle (BEV). In another example, the vehicle 10 could be another type of electrified vehicle, such as a hybrid electric vehicle (HEV), a plug-in hybrid electric vehicle (PHEV), or a conventional vehicle.

In particular, the example vehicle 10 includes an electrified powertrain capable of applying torque from an electric machine (e.g., an electric motor) to drive a pair of wheels 22. The vehicle 10 can include a traction battery pack, which powers the electric machine and, potentially, other electrical loads of the vehicle 10.

In the exemplary embodiment, a plurality of baseplates 30 are secured to the cargo bed 18. The baseplate 30A is larger than the baseplate 30B. Various accessories 34 can be secured to the vehicle 10 by engaging one or more of the baseplates 30. The accessories 34 can include a lockable storage box that holds tools, a refrigerator, etc. The accessory 34 could be a lidded lockable container. Still other example accessories could include: bicycle or motorcycle racks; ladder tacks; kayak racks; lighting stands, camping equipment, wood cutting equipment (e.g., chop saw), or partitions to separate sections of the cargo bed 18. Substantially any type of accessory having the requisite attachment interface can be secured to the vehicle 10 through the baseplates 30. For purposes of this disclosure, an accessory can be considered any item having this attachment interface.

With reference now to FIGS. 3-7 and continued reference to FIGS. 1 and 2, the accessories 34 can each engage one or more of the baseplates 30 via an attachment system. In the exemplary embodiment, the attachment system includes a plurality of apertures 42 and a plurality of feet 46.

In this example, the baseplates 30 provide the apertures 42 and the accessories 34 include the feet 46. This could be rearranged, however, such that some or all of the feet 46 extend from the baseplates 30 and the accessories 34 provide some or all of the apertures 42.

In the exemplary embodiment, when the baseplate 30 and the accessories 34 are engaged, the feet 46 are each received within one of the apertures 42 such that the feet 46 each extend from a first side 50 of the baseplate 30, through one of the apertures 42, and past an opposite, second side 54 of the baseplate 30.

The cargo bed 18 includes a floor 58, a front wall 62, a first side wall assembly 66D, a second side wall assembly 66P, and a tailgate assembly 70. In the exemplary embodiment, the baseplates 30 are attached directly to the floor 58.

Mechanical fasteners 72, welds, or another attachment could be used to secure peripheral flanges 74 of the baseplates 30 to the floor 58, which attaches the baseplates 30 to the floor.

Figure 3:
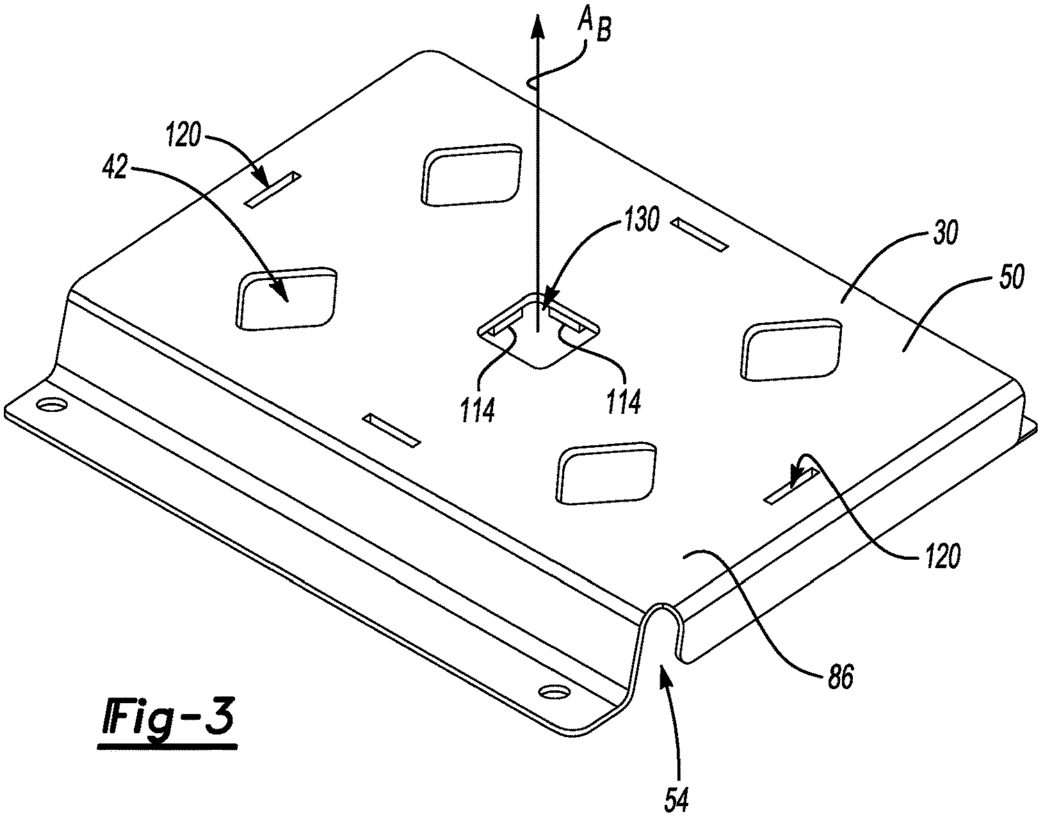
FIG. 3 illustrates a perspective view of one of the baseplates of FIG. 1.
Figure 4:
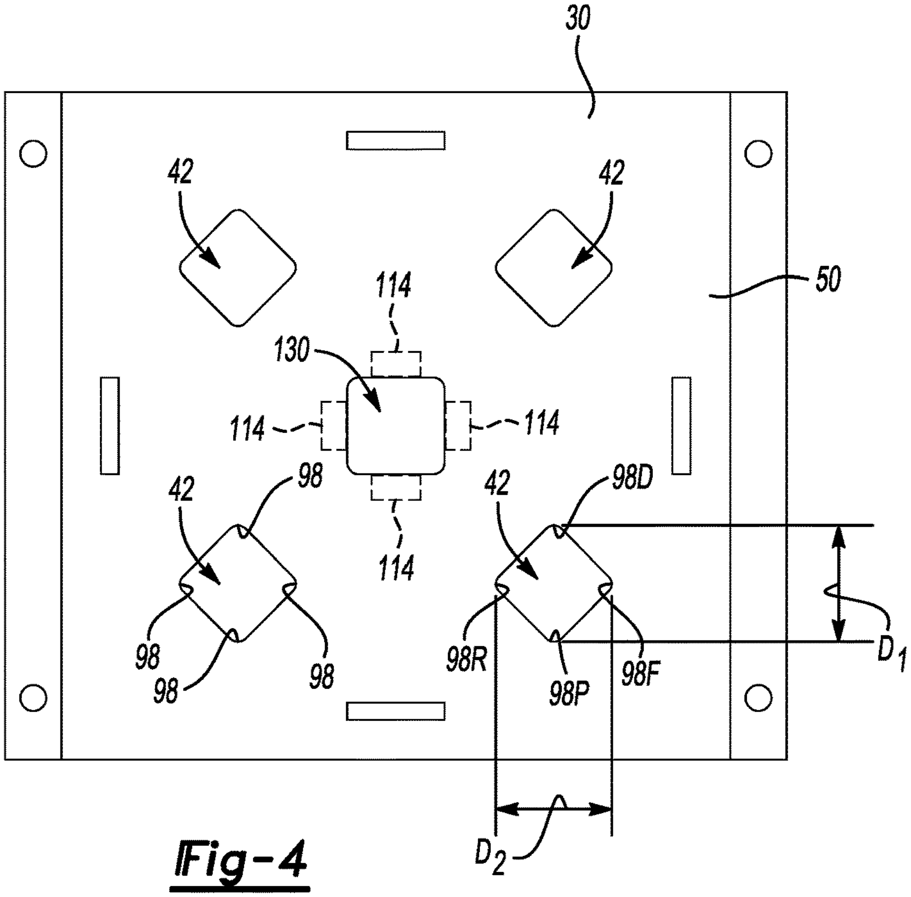
FIG. 4 illustrates a top view of the baseplate of FIG. 3.
Figure 5:
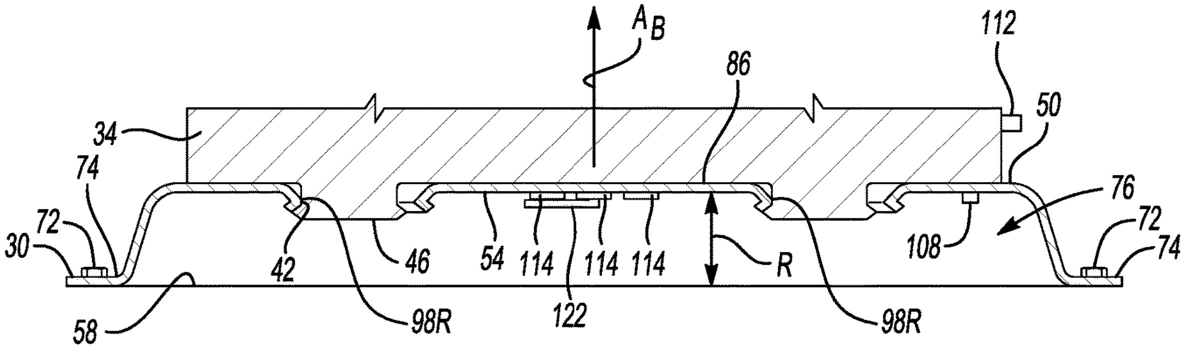
FIG. 5 illustrates a section view taken at line 5-5 in FIG. 2.

With reference now to FIGS. 3-5 and continuing reference to FIGS. 1 and 2, the areas of the baseplate 30 that provide the apertures 42 are raised a distance R (FIG. 5) from the floor 58 when the baseplate 30 is attached to the floor 58. This provides an open area 76 between the floor 58 and the apertures 42. When the baseplate 30 and the accessories 34 are engaged, the feet 46 extend into the open area 76. The distance R and, for that matter, the open area 76, can be sized to facilitate cleaning between the floor 58 and the raised areas of the baseplates 30.

Although the exemplary embodiment shows the baseplates 30 attached to the floor 58, the baseplates 30 could instead or additionally be attached to other areas of the vehicle 10 including, but not limited to, the front wall 62, the side wall assemblies 66D, 66A, and the tailgate assembly 70.

In this example, the baseplates 30 are a structure that provides the apertures 42 and are a structure that is separate from the floor 58. In another example, the floor 58 provides the apertures 42 and is considered the baseplate 30. Areas of the vehicle 10 other than the floor 58 could include apertures 42 or feet 46 and be considered the baseplate 30. For example, the tops 78 of the side wall assemblies 66P and 66D could include apertures 42 and be considered a baseplate.

In this example, each baseplate 30 includes at least one group 82 of the apertures 42. As shown in FIGS. 1 and 2, the baseplate 30A includes two groups 82 whereas the baseplate 30B includes one group 82.

A top or attachment surface 86 of each baseplate 30 is disposed along a plane. Each of the groups 82 of apertures 42 is circumferentially distributed about an axis $A_B$ that extends normal to that plane and thus normal to a top or attachment surface 86 of the baseplate 30.

Each of the groups 82 includes four apertures 42 circumferentially distributed a respective axis $A_B$. The four apertures 42 within each of the groups 82 are each offset ninety degrees about the axis $A_B$ from the adjacent apertures 42 within that group 82.

Figure 6:
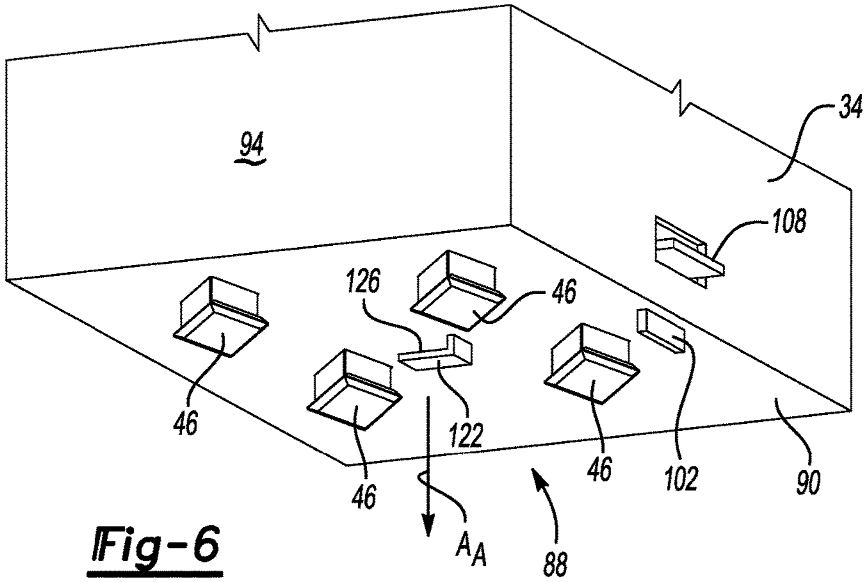
FIG. 6 illustrates a bottom view of the accessory of FIG. 1.
Figure 7:
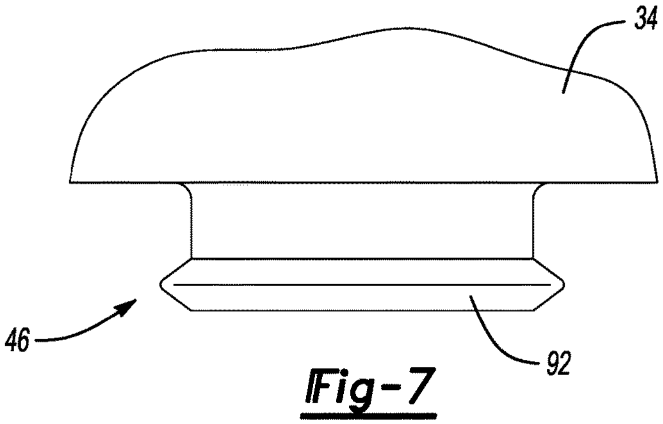
FIG. 7 illustrates a close-up view of a foot of the accessory of FIG. 6.

With reference now to FIGS. 6 and 7 and continuing reference to FIGS. 1-5, the accessory 34 includes at least one group 88 of feet 46 that are circumferentially distributed about an axis $A_A$ that extends normal to a bottom surface 90 of the accessory 34. The accessory 34 includes a single group 88 of the feet 46. Other accessories could include more than one group 88 of feet 46.

Each of the groups 88 includes four feet 46 circumferentially distributed about the axis $A_A$. The four feet 46 with each of the groups 88 are each offset ninety degrees about the axis $A_A$ from the adjacent feet 46 within that group 88. The feet 46 each extend from the accessory 34 to an enlarged collar 92, which gives each foot 46 an outwardly extending hook or lip.

In this example, a profile of each of the example apertures 42 is rectangular. Each of the apertures 42 include four corners 98. The apertures 42 are arranged such that one of the corners 98F is a forward corner, one of the corners 98R is a rear corner, one of the corners 98D is a driver side corner, and the other corner is a passenger side corner 98P.

When the baseplate 30 engages the accessory 34, the feet 46 of one of the groups 88 are each received within respective apertures 42. The baseplates 30 and apertures 42 can spaced such that the feet 46 in the group 88 of the accessory 34 can engage the four apertures 42 within group 82 on the outboard side of baseplate 30A, the four apertures 42 within the group 82 on the inboard side of baseplate 30A, or the four apertures 42 in the central area of baseplate 30, which are designated as apertures 42A in FIG. 2. In some examples, the accessory 34 could engage two apertures 42 within the baseplate 30A and two other apertures 42 in the baseplate 30B.

By using different arrangements of baseplates 30 and apertures 42, the cargo bed 18 can be configured to accommodate one or more accessories 34 in a wide variety of locations. The exemplary attachment system provided by the baseplates 30 is modular and can be adapted to particular needs.

Due to the sizing and spacing of the apertures 42 and feet 46, the baseplate 30 and the accessory 34 are configured to engage each other when the accessory 34 is in a first position or, alternatively, when the accessory 34 is in a second position where the accessory 34 is rotated ninety degrees clockwise about a vertical axis relative to the first position. In this example, the baseplate 30 can additionally engage the accessory 34 when the accessory 34 is in a third position that is rotated ninety degrees clockwise from the second position, and when the accessory 34 is in a fourth position where the accessory 34 is rotated ninety degrees from the third position.

The rotation and offset of the accessory 34 between the first, second, third, and fourth positions can be a rotation and offset about the axis $A_A$ or $A_B$, which are vertical axes in this example. The axes could extend in other non-vertical directions if, for example, the baseplate 30 were used in connection with an inner side of the side wall assemblies 66D and 66P.

Again, the first, second, third, and fourth positions are all ninety degrees offset from each other. This permits the baseplate 30 to engage the accessory 34 when a given side surface 94 of the accessory 34 is facing forward as shown, facing rearward, facing a driver side, or facing a passenger side. The ability to secure the accessory 34 in a variety of rotational orientations can enhance usability of the accessory 34.

A method of attaching the accessory 34 to the baseplate 30 can include sliding the accessory 34 over the baseplate 30 until each of the feet 46 can be received within one of the apertures 42. The method then includes sliding the accessory 34 a bit more until the enlarged collars 92 of the feet 46 extend beneath the baseplate 30 and "hook" the accessory 34 to the baseplate 30. Sliding the feet 46 until the enlarged collars 92 at least partially extend beneath the baseplate 30 captures part of the baseplate 30 between the feet 46 and the bottom surface 90 of the accessory 34, which engages the accessory 34 with the baseplate 30 and blocks withdrawal of the feet 46 from the apertures 42. The sliding of the accessory 34 transitions the accessory 34 from a disengaged position where the feet 46 can be withdrawn from the apertures 42, to an engaged position where the feet 46 are blocked from being withdrawn from the apertures 42.

Figure 8:
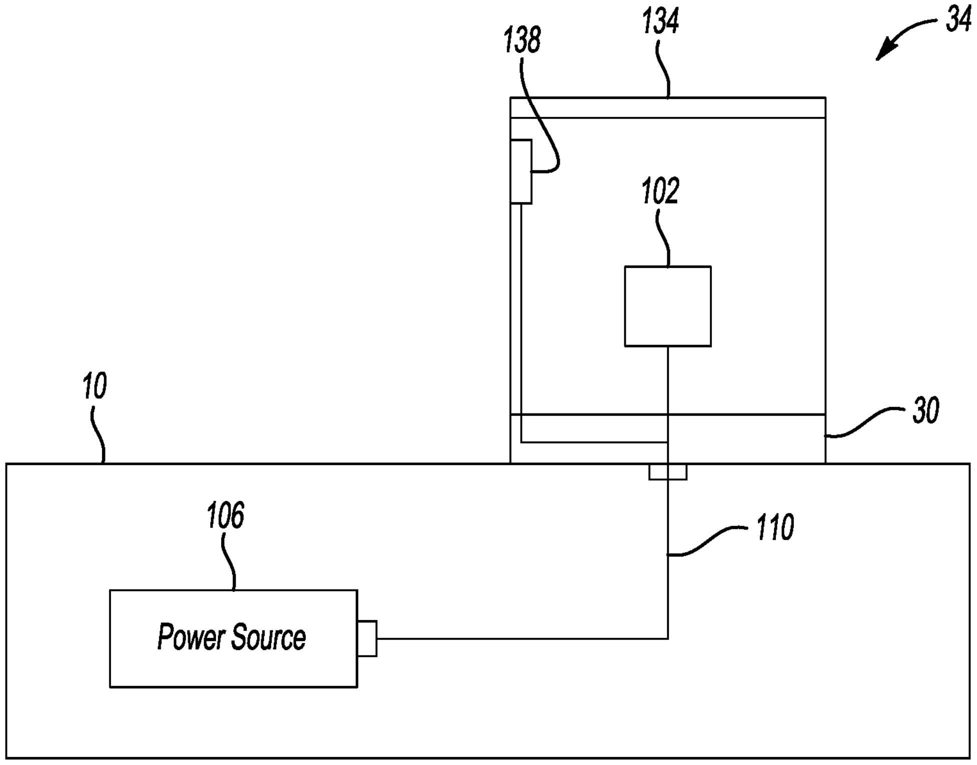
FIG. 8 illustrates a schematic view of an electrical relationship between the vehicle, the baseplates, and an accessory of FIG. 1.

With reference to the schematic view of FIG. 8, the accessory 34, in the exemplary embodiment, is configured to provide electrical power to at least one device 102 that is electrically coupled to the accessory 34. The device 102 can be a battery of a rechargeable tool, for example. In another example, the device 102 could be another device capable of being powered.

The vehicle 10 includes a power source 106 that provides the electrical power to the baseplate 30. The power source of the vehicle 10 could be an accessory battery or a traction battery.

A wired electrical harness 110 is used to convey electrical power from the power source 106 to the baseplate 30. The electrical power is transferred from the baseplate 30, to the accessory 34, and then to the device 102.

Figure 9:
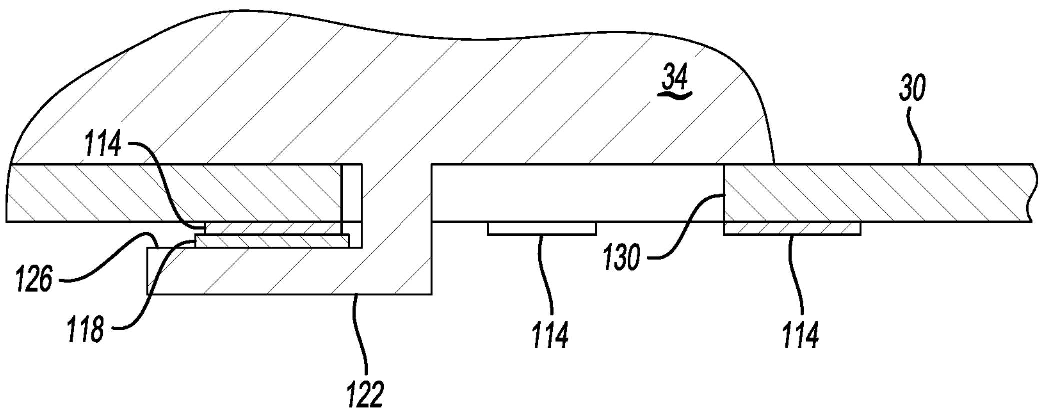
FIG. 9 illustrates close-up view taken at section 9-9 in FIG. 2 of an accessory tab contacting a baseplate tab so that electrical power can be transferred from the baseplate to the accessory.

With reference now to FIGS. 8-9 and continuing reference to FIGS. 1-7, the baseplate 30 includes one or more baseplate tabs 114, and the accessory 34 includes at least one accessory tab 118. At least one of the baseplate tabs 114 is electrically coupled to the accessory tab 118 when the baseplate 30 and the accessory 34 are engaged through the attachment system.

The example, accessory 34 include a hook structure 122 having an upwardly facing surface 126. The accessory tab 118 is disposed on the upwardly facing surface 126.

Sliding the accessory 34 into the engaged position moves the at least one accessory tab 118 into contact with the at least one baseplate tab 114. The at least one accessory tab 118 is then electrically coupled to the at least one baseplate tab 114 and electrical power can be transferred from the baseplate 30 to the accessory 34.

The baseplate 30 includes an opening 130 that receives the hook structure 122. The baseplate tabs 114 are distributed circumferentially about the opening 130. Accordingly, the accessory tab 118 can contact one of the baseplate tabs 114 when the accessory 34 is in the first position, second position, third position, or fourth position.

In another example, the accessory 34 receives the electrical power from the baseplate 30 via an inductive coupling with the baseplate 30. Sliding the accessory 34 into the engaged position can move a receiver coil of the accessory 34 into alignment with a transmitter coil of the baseplate 30 such that electrical power can wirelessly transfer from the baseplate 30 to the accessory 34.

In this example, the accessory 34 is a cargo box having a hinged lid 134. The at least one device 102 can be placed within the cargo box when the at least one device 102 is electrically coupled to the accessory 34. The electrical power from the baseplate 30 could, in some examples, be used to power electronically controlled locks that lock the hinged lid 134.

The accessory 34 can include a light 138. The light 138 can be used to illuminate an interior of the cargo box. The light 138 can be powered with electrically power from the baseplate 30.

The accessory 34 in other examples could be a refrigerated container, and the electrical power from the baseplate 30 could be used to power the refrigerated container.

The accessory 34 in another example could include a Wi-FI or Bluetooth receiver/sender that is powered using electrical power from the baseplate 30.

The accessory 34 in another example could include a battery that is recharged using electrical power from the baseplate 30.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle accessory assembly, comprising:

an accessory configured to engage a baseplate to secure the accessory to a vehicle, the accessory and the baseplate configured to engage each other through an attachment system having a plurality of feet that are each received within one of a plurality of apertures when engaged, the accessory configured to provide electrical power to at least one device that is electrically coupled to the accessory, and wherein each foot is moveable between an insertion position where the plurality of feet are received within apertures and can be withdrawn from the plurality of apertures and a retention position to prevent withdrawal of the plurality of feet from the plurality of apertures, and wherein each foot moves in a first direction into a respective aperture to reach the insertion position and moves in a second direction, different than the first direction, to reach the retention position.

2. The vehicle accessory assembly of claim 1, wherein the accessory is a cargo box having a hinged lid.

3. The vehicle accessory assembly of claim 1, wherein the vehicle provides the electrical power that the accessory provides to the at least one device.

4. The vehicle accessory assembly of claim 3, wherein the accessory receives the electrical power from the vehicle through the baseplate.

5. The vehicle accessory assembly of claim 4, wherein the accessory includes the plurality of feet that are configured to engage the plurality of apertures within the baseplate.

6. The vehicle accessory assembly of claim 5, further comprising at least one tab of the accessory and at least one tab of the baseplate that is electrically connected to a power source, the at least one tab of the accessory configured to electrically couple to the at least one tab of the baseplate when the accessory and the baseplate are engaged through the attachment system.

7. The vehicle accessory assembly of claim 6, wherein the at least one tab is disposed on an upwardly facing surface of the accessory.

8. The vehicle accessory assembly of claim 1, wherein the accessory receives the electrical power through an inductive coupling with the baseplate.

9. The vehicle accessory assembly of claim 1, wherein the accessory comprises a cargo box that includes at least one light, the at least one light powered with electrical power from the vehicle to illuminate an interior of the cargo box.

10. A vehicle accessory assembly, comprising:

an accessory configured to engage a baseplate to secure the accessory to a vehicle, the accessory and the baseplate configured to engage each other through an attachment system having a plurality of feet that are each received within one of a plurality of apertures when engaged, the accessory configured to provide electrical power to at least one device that is electrically coupled to the accessory, and wherein each foot is moveable between an insertion position where the plurality of feet can be withdrawn from the plurality of apertures and a retention position to prevent withdrawal of the plurality of feet from the plurality of apertures; and wherein the baseplate is mounted within a vehicle cargo area and has a first side and an opposite, second side that faces a cargo area outer surface, and wherein the plurality of feet each extend from the accessory and the plurality of apertures are formed in the baseplate, wherein, when the accessory is secured to the vehicle through the baseplate, the plurality of feet extend from the first side of the baseplate, through one of the plurality of apertures, and past the opposite, second side of the baseplate and into an open area between the cargo area outer surface and the opposite, second side of the baseplate.

11. The vehicle accessory assembly of claim 10, wherein, when the accessory is engaged with the baseplate, enlarged collars of the plurality of feet capture respective portions of the baseplate to block withdrawal of the plurality of feet from the plurality of apertures.

12. The vehicle accessory assembly of claim 10, wherein the vehicle is a pickup truck and the baseplate is attached directly to a floor of a cargo bed of the pickup truck.

13. The vehicle accessory assembly of claim 1, wherein the accessory is configured to engage the baseplate when the accessory is in a first position, and when the accessory is in a second position that is rotated relative to the first position.

14. The vehicle accessory assembly of claim 13, wherein a rotation of the accessory from the first position to the second position is rotation about a vertical axis.

15. The vehicle accessory assembly of claim 13, wherein the accessory is configured to engage the baseplate in a third position that is different than the first position and the second position, and further configured to engage the baseplate in a fourth position that is different than the first position, the second position, and the third position.

16. A vehicle accessory power transfer method, comprising:

receiving a plurality of feet within a plurality of apertures via movement of the plurality of feet in a first direction along an insertion path;

sliding an accessory relative to a baseplate in a second direction different than the first direction to engage the accessory in a retention position with the baseplate, where the accessory is secured relative to a vehicle such that the plurality of feet cannot be withdrawn from the plurality of apertures, the baseplate secured to the vehicle; and electrically powering at least one device using the accessory.

17. The vehicle accessory power transfer method of claim 16, wherein the accessory is a cargo box having a hinged lid.

18. The vehicle accessory power transfer method of claim 16, further comprising providing electrical power to the accessory from the vehicle.

19. A vehicle accessory power transfer method, comprising:

receiving a plurality of feet within a plurality of apertures via movement in a first direction, wherein the plurality of apertures comprises discrete groups of apertures;

sliding an accessory relative to a baseplate in a second direction different than the first direction to engage the accessory with the baseplate and secure the accessory relative to a vehicle such that the plurality of feet cannot be withdrawn from the plurality of apertures, the baseplate secured to the vehicle;

spacing the discrete groups of apertures apart from each other on the baseplate such that each group can receive one accessory;

forming each discrete group to include a set of apertures that surround a power opening extending through a thickness of the baseplate;

providing electrical power to the accessory from the vehicle, including providing the accessory with an accessory power interface configured to communicate with a plate power interface of the baseplate via the power opening;

delivering the electrical power to the accessory through the power opening in the baseplate; and electrically powering at least one device using the accessory.

20. The vehicle accessory power transfer method of claim 16, wherein the baseplate includes the plurality of apertures, and the baseplate is secured to the vehicle, wherein the accessory is configured to engage the baseplate when the accessory is in a first position, and when the accessory is in a second position that is rotated relative to the first position, the accessory configured to electrically power the at least one device when the accessory is in the first position and when the accessory is in the second position.

21. The vehicle accessory power transfer method of claim 16, wherein the baseplate includes the plurality of apertures, and including mounting the baseplate within a vehicle cargo area, and inserting the plurality of feet to extend through a thickness of the baseplate from a first side of the baseplate, through one of the plurality of apertures, and past an opposite, second side of the baseplate and into an open area between the opposite, second side of the baseplate and an outer surface of the vehicle cargo area.

22. The vehicle accessory power transfer method of claim 16, including forming an extension portion at least partially surrounding each foot, and wherein, during sliding of the accessory relative to the baseplate, an outward surface of the extension portion moves to engage a surface surrounding each respective aperture of the plurality of apertures to prevent withdrawal of the plurality of feet from the plurality of apertures.

23. The vehicle accessory assembly of claim 1, wherein each foot includes an extension portion at least partially surrounding each foot and wherein an outward surface of the extension portion comes into engagement with a surface surrounding each respective aperture of the plurality of apertures to prevent withdrawal of the plurality of feet from the plurality of apertures when in the retention position.

24. The vehicle accessory assembly of claim 23, wherein there is relative movement in a first direction between the plurality of feet and the plurality of apertures during insertion, and there is relative movement in a second direction, different than the first direction, when moving from the insertion position to the retention position.

25. A vehicle accessory assembly, comprising:

an accessory configured to engage a baseplate to secure the accessory to a vehicle, the accessory and the baseplate configured to engage each other through an attachment system having a plurality of feet that are each received within one of a plurality of apertures when engaged, the accessory configured to provide electrical power to at least one device that is electrically coupled to the accessory, and wherein each foot is moveable between an insertion position where the plurality of feet can be withdrawn from the plurality of apertures and a retention position to prevent withdrawal of the plurality of feet from the plurality of apertures;

wherein the vehicle provides the electrical power that the accessory provides to the at least one device, and wherein the accessory receives the electrical power from the vehicle through the baseplate;

wherein the accessory includes the plurality of feet that are configured to engage the plurality of apertures within the baseplate;

at least one tab of the accessory and at least one tab of the baseplate that is electrically connected to a power source, the at least one tab of the accessory configured to electrically couple to the at least one tab of the baseplate when the accessory and the baseplate are engaged through the attachment system; and wherein the baseplate includes at least one power opening surrounded by the plurality of apertures, wherein the plurality of apertures are spaced apart from the at least one power opening and from each other, and wherein the at least one tab of the baseplate comprises a plurality of plate tabs that are attached to a lower surface of the baseplate and are spaced apart from each other about a periphery of the at least one power opening such that the at least one tab of the accessory can engage one plate tab in every mounting position.

26. The vehicle accessory assembly of claim 10, wherein the plurality of apertures comprises discrete groups of apertures that are spaced apart from each other on the baseplate, wherein each group can receive one accessory.

27. The vehicle accessory assembly of claim 26, wherein each group is comprised of a set of mounting apertures and additionally includes a power opening extending through a thickness of the baseplate and that is surrounded by the set of mounting apertures, and wherein the accessory includes an accessory power interface and the baseplate includes a plate power interface that communicate with each other via the power opening to supply power from a vehicle power source to the accessory.

28. The vehicle accessory assembly of claim 1, wherein:

in the insertion position the plurality of feet are aligned with and received within apertures;

in the retention position the plurality of feet are received within apertures and moved within the apertures in the second direction to be offset from alignment with the apertures; and the first direction and the second direction are perpendicular to each other.

29. The vehicle accessory power transfer method of claim 16, including:

moving along the insertion path in the first direction to achieve an insertion position where the plurality of feet are aligned with and received within apertures;

moving the plurality of feet within the apertures in the second direction to be offset from alignment with the apertures to achieve the retention position; and wherein the first direction and the second direction are perpendicular to each other.

30. The vehicle accessory assembly of claim 1, wherein the second direction is transverse to the first direction.

31. The vehicle accessory assembly of claim 1, wherein a perimeter of each aperture of the plurality of apertures is entirely defined by the baseplate.

32. The vehicle accessory assembly of claim 10, wherein a portion of each foot engages a downward facing surface of the baseplate when in the retention position.

33. The vehicle accessory assembly of claim 10, wherein a perimeter of each aperture of the plurality of apertures is entirely defined by the baseplate.

34. The vehicle accessory power transfer method of claim 16, wherein the second direction is transverse to the first direction.

35. The vehicle accessory power transfer method of claim 16, wherein a perimeter of each aperture of the plurality of apertures is entirely defined by the baseplate.

* * * * *